(No Model.) 4 Sheets—Sheet 1.
H. C. REW.
PROCESS OF AND APPARATUS FOR MANUFACTURING GAS.
No. 339,472. Patented Apr. 6, 1886.
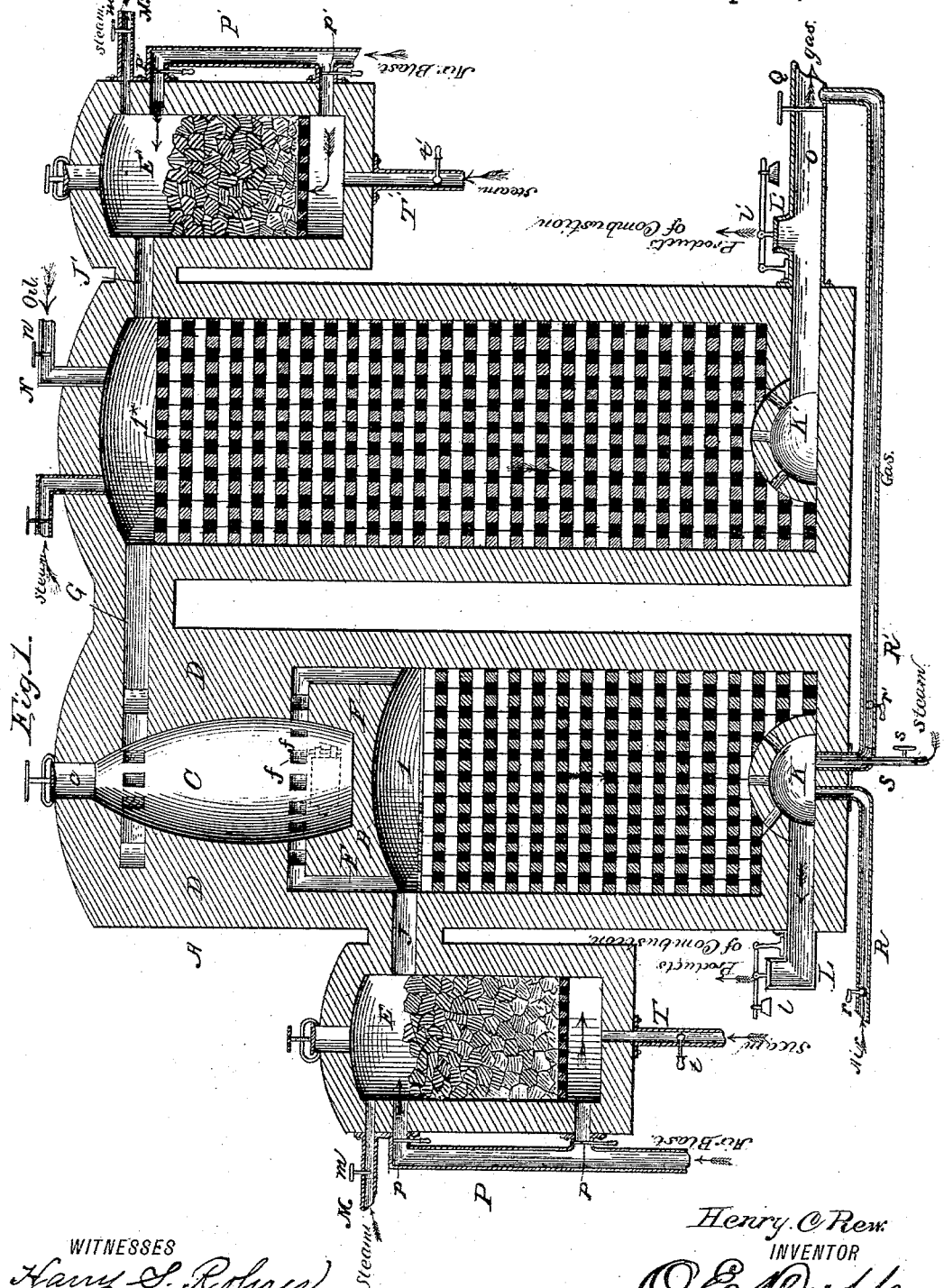
WITNESSES
Harry S. Rohrer
John Enders Jr.
Henry C. Rew
INVENTOR
By O. E. Duff
Attorney (No Model.) 4 Sheets—Sheet 2.
H. C. REW.
PROCESS OF AND APPARATUS FOR MANUFACTURING GAS.
No. 339,472. Patented Apr. 6, 1886.
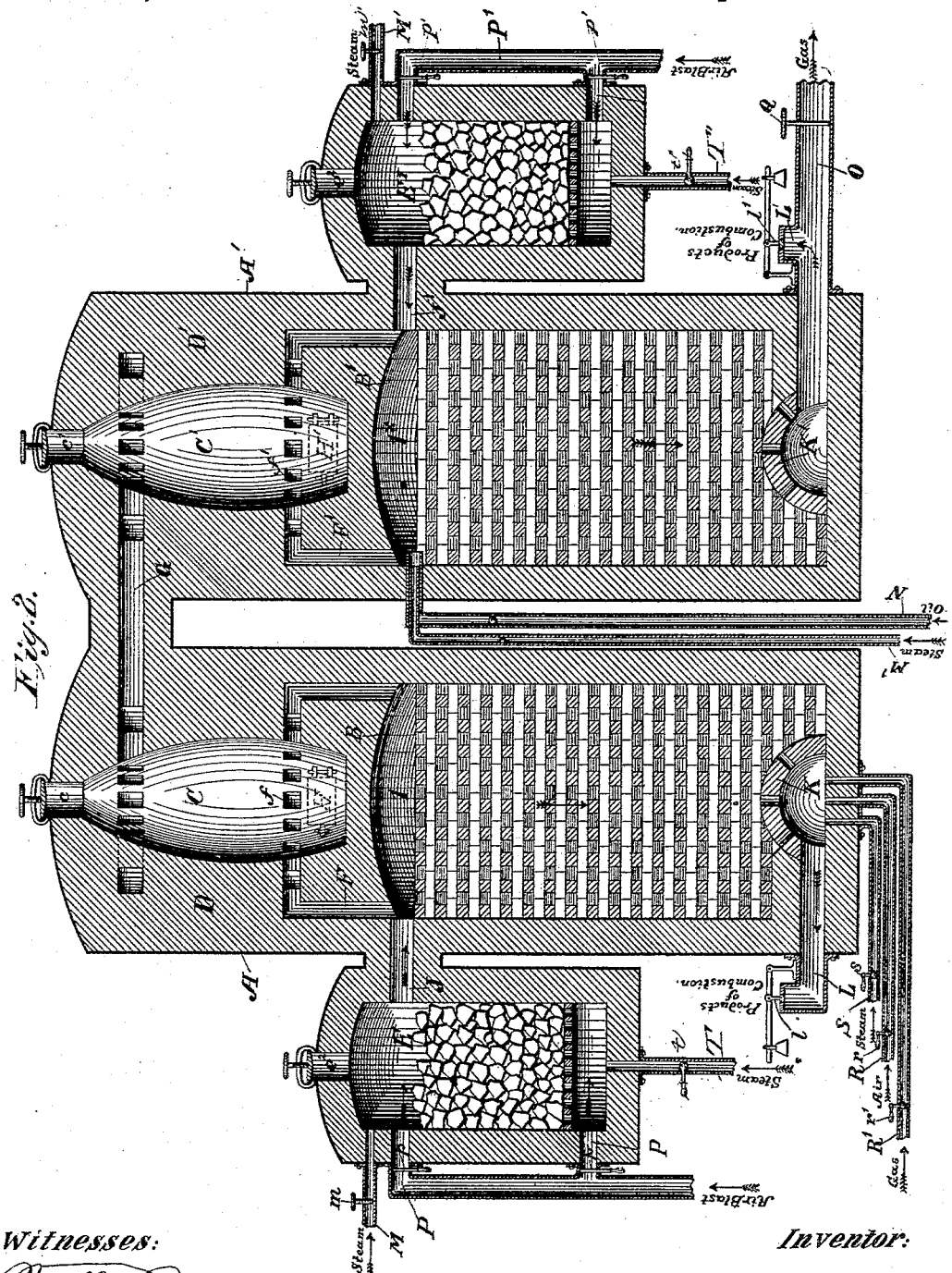
Witnesses:
Chas J Baur
Horace Chadwick
Inventor:
Henry C. Rew
O E Duffy
Atty.

(No Model.)   H. C. REW.   4 Sheets—Sheet 3.
PROCESS OF AND APPARATUS FOR MANUFACTURING GAS.
No. 339,472.   Patented Apr. 6, 1886.
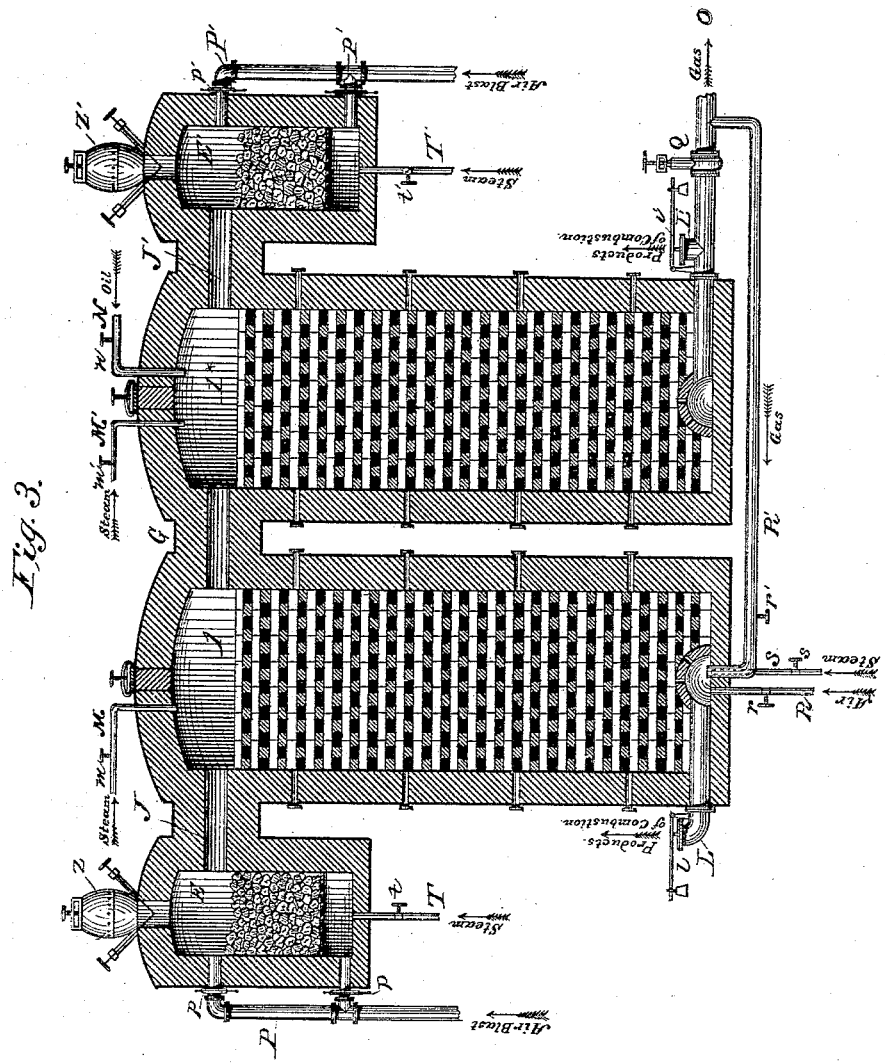

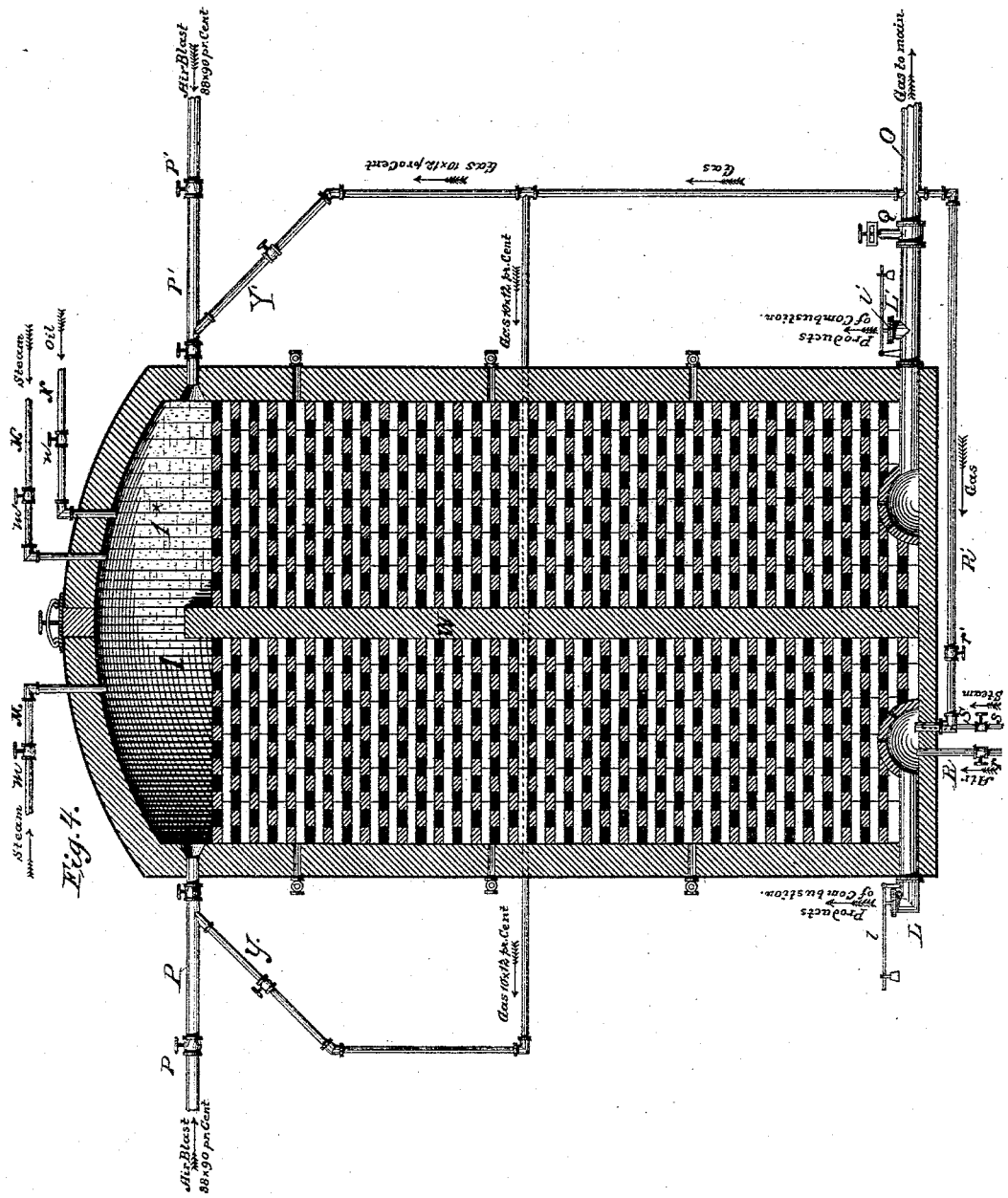

UNITED STATES PATENT OFFICE.

HENRY C. REW, OF CHICAGO, ILLINOIS.

PROCESS OF AND APPARATUS FOR MANUFACTURING GAS.

SPECIFICATION forming part of Letters Patent No. 339,472, dated April 6, 1886.

Application filed December 8, 1885. Serial No. 185,086. (No model.)

*To all whom it may concern:*

Be it known that I, HENRY C. REW, of Chicago, in the county of Cook and State of Illinois, have invented certain new and useful Improvements in a Process of and Apparatus for Manufacturing Gas; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to the manufacture of gas, and is an improvement on a process and apparatus invented by me in 1883, and covered by Patent No. 290,926, dated December 25, 1883. In that patent three chambers are shown—namely, a steam-superheating chamber, 1, a generating-chamber, C, and a gas-fixing chamber, 1*—all located in one structure and placed side by side.

The object of this improvement is, first, to place each of the aforesaid chambers in separate gas-tight iron shells, experience having demonstrated that highly heated and expanded gases cannot be controlled by brick walls alone; second, to take greater and the greatest possible advantage of the tendency of heat to rise, and to apply the heat both at the bottom and top of the gas-producing material in the generating-chamber C; third, to bring the heat in direct contact with the carbonaceous material in chamber C, without the interposition of the brick walls shown in said Patent No. 290,926; fourth, to provide a process and apparatus that will utilize materials that cannot be blasted with air to advantage to bring them to incandescence, such as bituminous coal, breeze, and carbonaceous waste of all kinds; fifth, to provide a long and high fixing-chamber, 1*, through which the gas passes in a downward direction after leaving the generating-chamber C. The tendency of the heat to rise leaves the heat in the refractory material, and the gas passes off to the main, O, carrying less heat.

Having stated the object and nature of my improvement, I will now describe it more particularly with reference to the accompanying drawings.

Similar letters of reference designate like parts, as in Patent No. 290,926, to which reference is hereby made.

Figure 1 represents a vertical section of the apparatus, showing one fuel or generating chamber, which may be constructed in various ways, as hereinafter described. Fig. 2 represents a vertical section of the apparatus, showing two fuel or generating chambers. Fig. 3 represents a vertical section of the apparatus in a modified form, as constructed for generating gas from steam, gas, and liquid hydrocarbons; and Fig. 4 represents a modified form of the same apparatus, with the superheating and fixing chambers built in one structure and provided with gas and air pipes for heating the refractory material in said chambers, as shown in said Patent No. 290,926.

The fuel-chambers C C' are located above the superheating and fixing chambers 1 and 1*, supported by dividing-arches B B', and inclosed by walls D D', surrounded by gas-tight metallic shells A A'.

To operate the apparatus, the steam-superheating chamber 1 and the gas-fixing chamber 1* are loosely filled with refractory material. The generating-chamber C is properly charged with carbonaceous material through the opening at the top of the chamber, and the cover is then tightly closed. The heat-producing chambers E E' are ordinary furnaces, with grate-bars, connected by flues J J' with chambers 1 and 1*, and are properly filled with carbonaceous material, preferably hard coal, through the openings at the tops of the chambers, and the covers are then tightly closed. The coal in E E' is ignited and the fires are simultaneously urged with the air-blast through the pipes P P', having branches controlled by valves *p p'*. Air is also admitted above the fires through the branch pipes controlled by valves *p p'*, which burns the gases, and the heat created is driven into the chambers 1 and 1* at the top of each, through the flues J J', and the highly-heated products of combustion pass downward through the loose refractory material and out at the outlets L L', controlled by valves *l l'*. This method of heating the refractory material is continued until a sufficient quantity of heat is accumulated and stored in the brick-work for the manufacture and fixing of gas. When properly heated, the air-blasts to the furnaces E E' are shut off. The chambers 1 and 1* are then cleared of the products of combustion remaining in them, by admitting jets of steam at the top of each through pipes M and M', controlled by valves $m$ and $m'$, which drives out the carbonic-acid gas at the outlets L L', leaving them filled with superheated steam. The outlets L L' are then closed, the valve Q in the main O is opened, and the apparatus is then ready to make and fix gas.

During and after the operation of heating the refractory material the heat in chambers 1 and 1* is imparted to the carbonaceous material in chamber C and C', and the temperature in the four chambers 1 and 1* and C and C', (and in 1 and C particularly when only one fuel-chamber is used,) is rapidly equalized by the rising of the heat and the circulation of hot gases through the flues F, $f$, and G, so that the carbonaceous material in chamber C is brought up to the same incandescence as the refractory material in chambers 1 and 1*. Steam, air, or gas, or any desired mixture of the same, is then admitted at the bottom of chamber 1 through pipes S, R, and R', controlled by valves $s$ and $r$ $r'$, and is driven up through the highly-heated refractory material, raising the mixed gases to the temperature (say 2000°) necessary for their decomposition when brought into contact with carbon.

From the top of chamber 1 (being, until the heat stored in the refractory material is exhausted, the hottest part of the chamber) the hot gases pass through the flues F $f$, into the lower portion of the incandescent carbonaceous material contained in chamber C, where they combine with the carbon, forming carbonic oxide and hydrogen or water-gas, provided that steam and gas are passed through the superheating-chamber. The hot water-gas passes up through the hot carbonaceous material in chamber C, distilling off the gases. Then the mixed gases pass through the flue G, into the fixing-chamber 1*, and down through the heated refractory material, where they are combined and fixed into a homogeneous gas, then out through the outlet controlled by valve Q, to the main O.

A test-burner, to show the quality of the gas, may connect with the main O, and in case the gas needs enriching a sufficient quantity of oil or oil vapor is admitted at the top of chamber 1* through the pipe N, controlled by valve $n$, which is vaporized by the heat and enriches and is combined with the gas in passing down through fixing-chamber 1*, so that gas of any required candle-power can be produced.

Air or a non-illuminating gas or steam may be separately driven into the bottom of 1 through pipes R R' or S, to take up and drive the heat stored in chamber 1 forward into the generating-chamber C, according to the quality of gas which it is desired to make or the use for which it is intended.

Water-gas may be added through the flue J to the gases passing upward through chamber 1 by admitting steam to the bottom of the furnace E through pipe T, controlled by valve $t$. Water-gas may also be added (if desired) through flue J' to the gases passing downward through chamber 1* by admitting steam to the bottom of the furnace E' through pipe T', controlled by valve $t''$.

Ashes may be removed through the doors H H', at the bottom of the chambers C C', and from the ash-pits in the auxiliary furnaces through doors. (Not shown.)

One furnace, E, only may be used for heating the chambers 1 and 1*, thus constructing the apparatus in a more compact manner, and the chamber 1* can in that case be heated in the following manner: After heating the superheating-chamber 1, with the auxiliary furnace E in the manner described, the gas-producing material in the generating-chamber C can be quickly brought to incandescence by driving an air-blast into the lower part of the superheating-chamber 1 through the pipe R. The generating-chamber C is thus furnished with a highly-superheated air-blast when material is used in it that can be blasted with air—such as hard or soft coal—(commencing with coke at the bottom, when soft coal is used.) In this case the auxiliary furnace E' could be dispensed with, retaining only the pipe J' to admit air for burning the products of combustion coming from the generating-chamber C, for the purpose of heating the fixing-chamber 1*, thus simplifying the construction.

The apparatus may be constructed with two fuel-chambers C and C', as shown in Fig. 2, by which means a larger quantity of fuel may be exposed to the action of direct heat by the rising of the heat and the circulation of hot gases through the flues F $f$ F' $f'$, connecting the fuel-chambers at their bases with the tops of the superheating and fixing chambers 1 and 1*. As the action of the heat raises the fuel to incandescence, a much larger quantity of fuel is thus provided, through which the gases pass on their way from the superheating-chamber 1 to the fixing-chamber 1*, thereby causing the perfect decomposition of the mixed gases and their combination with the carbonaceous materials and vapors in the fuel-chambers C C'.

Furthermore, as a perfect gas apparatus should manufacture perfect fixed gas from anything that will burn, it is proper to show that the same apparatus may be operated to generate gas from steam, gas, and liquid hydrocarbons. For such use no solid carbonaceous fuels are required in the fuel-chambers C C', and they may be filled, if desired, with loosely-packed refractory material and used in connection with the lower chambers as superheating and fixing chambers.

Heretofore in the manufacture of gas with steam and liquid hydrocarbons no gas has been used to partially decompose the steam before adding the carbureting oils, but oil (or oil vapors) and steam have been employed by mixing them and then passing them through or over heated surfaces for the purpose of decomposing the steam and fixing the gases.

This process has been found defective and inoperative, for the reason that the oil (or oil vapors) is decomposed and turned partially into tar, lamp-black, and fixed carbon by moderate heat before the steam had reached and been decomposed by the high heat required, and the gas produced is only a vapor and not a fixed gas. By first mixing the steam with gas in my apparatus this difficulty is overcome. The gas passes up with the steam through the superheating-chamber 1, previously heated, until the steam reaches its decomposing temperature in the presence of carbon. Then the gas and steam unite, forming carbonic-acid and hydrogen gas, thus putting the steam and mixed gases into a condition the more readily to take up carbon when liquid hydrocarbons or their vapors are admitted. Carbonaceous vapors are then admitted in the fixing-chamber 1*, previously heated, which quickly unite with the carbonic-acid and hydrogen gases, forming carbonic-oxide and hydrogen, and at the same time carbureting the mixed gases sufficiently to form an illuminating-gas of any desired candle-power, which are fixed into a homogeneous gas by passing down through the heated fixing-chamber 1*, then through the outlet O to the main.

Fig. 3 shows a modification in construction of the apparatus when designed to manufacture gas from steam, gas, and liquid hydrocarbons, the fuel-chambers C C' being left out in order to cheapen the construction.

Fig. 4 shows still another modification of the apparatus when designed to make gas from steam, gas, and liquid hydrocarbons. In this case the superheating and fixing chambers 1 and 1* are both built in one structure, separated by the dividing-wall W, and they are heated as in the previous cases by hot gases passing downward through them; but in this latter case the hot gases are created by the combustion of gas and air, as shown in Patent No. 290,926, granted me December 25, 1883, in the proportion of ten to twelve per cent. of gas and eighty-eight to ninety per cent. of air, this being practically the proportions that cause the most perfect combustion and burns with the highest heat. The gas is drawn, as shown, from the main near the works through the pipes Y Y' by the force of the air-blasts, and the mixed gas and air, having been previously set on fire or lighted in the most convenient manner, are driven into the chambers 1 and 1* where perfect combustion ensues and the hot products pass down and out at the outlets L L'.

The gas being drawn from the main before having been passed through the purifiers, is cheaper to use for the purpose, and a fire of great intensity, (practically the compound hydrogen blow-pipe,) easily controlled and practically automatic, is thus provided in the cheapest and most convenient manner to heat the refractory material in the superheating and fixing chambers 1 and 1*.

It is understood that the superheating and fixing chambers shown in Figs. 1, 2, and 3, may be heated in the same manner as the method above described, in which case the gas and air pipes shown in Fig. 4 should be substituted for the auxiliary furnaces E and E', (shown in Figs. 1, 2, and 3,) and used in the manner above described for heating the refractory material.

The auxiliary heating-chambers E E' and the generating-chambers C C' are preferably fitted with any suitable tight feeding apparatus, such as shown in Fig. 3.

I am aware that gas-apparatus has been designed with a fuel or generating chamber above and a gas-fixing chamber below somewhat similar to chambers 1 and C in my apparatus, and I especially disclaim such apparatus for the following reasons: In such apparatus the fuels in C are designed to be blasted with air, and the chamber 1 to be heated by burning the products of combustion driven down through flues controlled by valves coming from the top of the generating-chamber C. In my apparatus, on the contrary, the carbonaceous material in chamber C is designed to be of such a character (such as bituminous coal, breeze, and the waste carbonaceous materials produced by saw-mills, tanneries, &c.,) that it cannot be blasted with air to advantage, and no air-blast is intended to be used in firing up the material used in my generating-chamber C, and no flue is designed to connect the top of the generating-chamber C and chamber 1. Furthermore, in the manufacture of gas in such apparatus grate-bars are required, and steam is decomposed in the upper chamber and water-gas is brought down by a connecting-flue controlled by valves, and enriched and fixed in the lower chamber and the circulation of gases during the process of manufacture is downward, and valves are required to control the flues. On the contrary, in my apparatus no provision is made, nor flues with valves provided for such a process. No grate bars are used in the generating-chamber. The circulation of gases when gas is being made is from the bottom of chamber 1 upward, and no valves are required in the connecting-flues, there being thus no similarity in the material used or in the character of the process and apparatus.

Having thus described my invention, what I claim, and desire to secure by Letters Patent, is—

1. The combination of the superheating-chamber 1, having a steam-supply pipe connecting with its base, the fuel-chamber C, located at the top thereof, the connecting-flues F $f$, and separate means for supplying heating-gases to the superheating-chamber, for the purpose described.

2. The combination of the superheating-chamber 1, having steam, gas, and air supply pipes and outlet for products of combustion connecting with its base, the fuel-chamber C, located at the top thereof, the connecting-flues F *f*, and separate means for supplying heating-gases to the superheating-chamber, for the purpose described.

3. The combination of the superheating-chamber 1, having one or more supply-pipes for gaseous fluids connecting with its base, the fuel-chamber C, located at the top thereof, the connecting-flues F *f*, and an auxiliary heating-furnace, E, connecting with the top of the superheating-chamber, for the purpose described.

4. The superheating and fixing chamber 1, having a steam-supply pipe connecting with its base and separate means for supplying it with heating-gases, the fuel and generating chamber located above such superheating-chamber, and the connecting-flues F *f*, in combination with a fixing-chamber, 1*, connecting with the top of the generating-chamber, whereby the hot gases rising in chamber 1 will impart their heat to the lower portion of the fuel, while the hot gases rising in chamber 1* will impart their heat to the upper portion of the fuel till it is highly heated for generating gas.

5. The combination of the auxiliary heating-furnaces E E', connecting with the top of superheating-chamber 1, and gas-fixing chamber 1*, with chambers 1, C, and 1*, and connecting-flues, for the purpose described.

6. The combination of furnaces E E', the superheating and gas-fixing chambers 1 and 1*, the generating-chamber C, and connecting-flues, with the steam, fuel, air, oil, and gas supply pipes and gas-outlets having controlling-valves, as and for the purpose described.

7. The superheating and fixing chamber 1, having a steam-supply pipe connecting with its base, and means for heating it, the fuel and generating chamber located above such superheating-chamber, and connecting-flues F *f*, in combination with a second fuel-chamber, a fixing-chamber located below it, connecting-flues G F' *f'*, and an oil-supply pipe connecting with the fixing-chamber, whereby double the quantity of fuel is subjected to the action of direct heat, for the purpose described.

8. The chambers 1 and 1*, connected at their tops, in combination with means for supplying heating-gases to the tops thereof, and the steam, gas, and oil inlet pipes, and the outlets for products of combustion and gas-connecting, as described, and for the purpose set forth.

9. The process of manufacturing gas, which consists in simultaneously heating a superheating and a fixing chamber loosely filled with refractory material by hot gases driven downward through the refractory material, then admitting mixed steam and gas at the bottom of the superheating-chamber and passing them upward through such chamber, thereby forming carbonic-acid and hydrogen gases, then admitting oil vapors and mixing them with the gases, forming carbonic oxide and hydrogen, and carbureting them and fixing the mixed gases and vapors into a homogeneous gas by passing them downward through the heated fixing-chamber.

10. The process of manufacturing gas, which consists in heating a superheating-chamber and a fixing-chamber loosely filled with refractory material, by passing hot gases down through the brick-work, thereby storing the heat of the gases in the brick-work, and heating an intermediate body of fuel by allowing the heat to rise, then passing steam, air, or gas, or any mixture of the same upward through the superheating-chamber into the intermediate chamber containing carbonaceous material and situated above both the superheating and fixing chambers, then combining and fixing the gases thus produced by passing them from the intermediate or generating chamber downward through the heated fixing-chamber.

In testimony that I claim the foregoing as my own I hereby affix my signature in presence of two witnesses.

HENRY C. REW.

Witnesses:
O. E. DUFFY,
HARRY ROHRER.